April 16, 1929.  L. W. COPPOCK  1,709,777
MOTOR VEHICLE
Filed Feb. 4, 1925
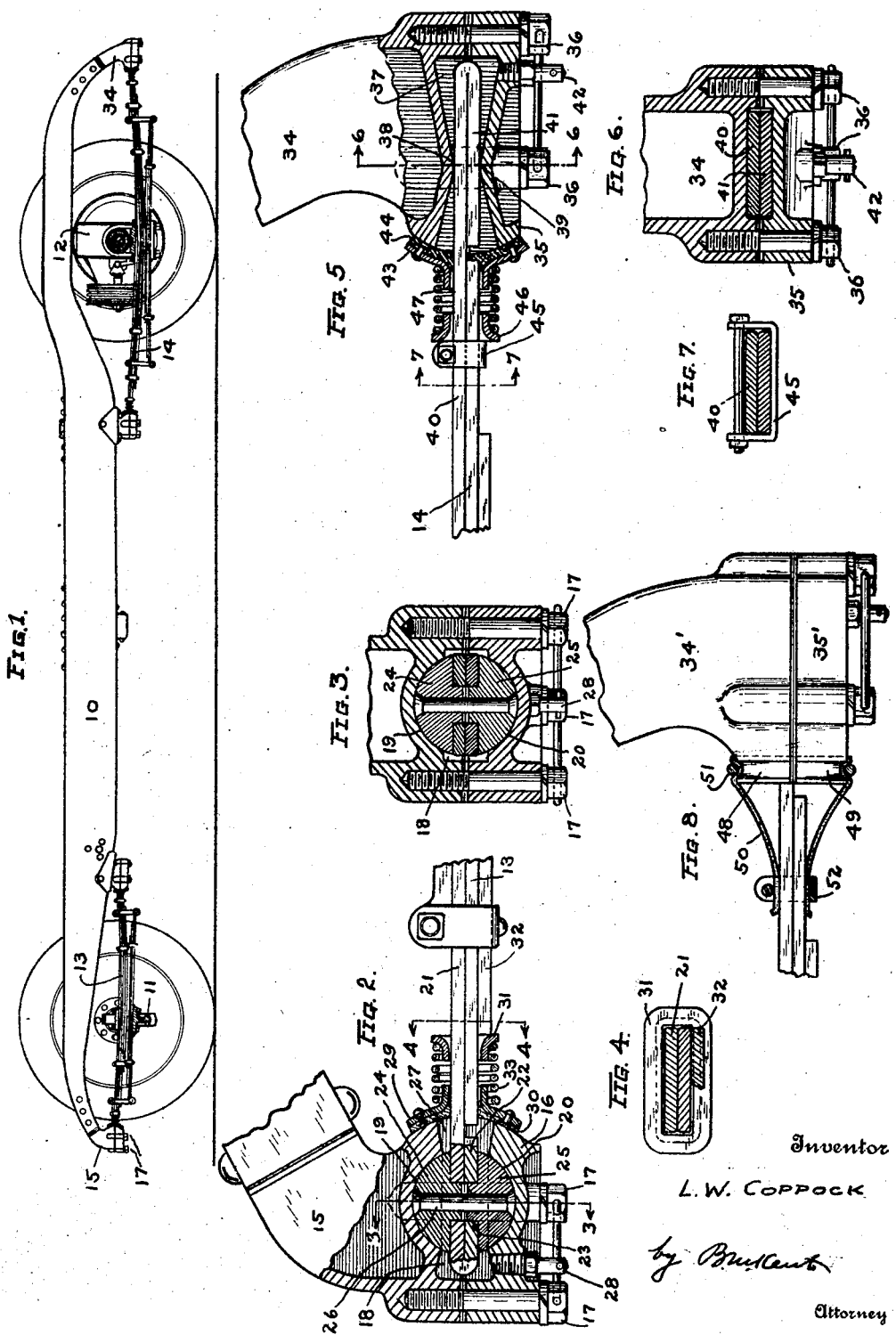
Inventor
L. W. Coppock
Attorney Patented Apr. 16, 1929.

1,709,777

UNITED STATES PATENT OFFICE.

LEMBERT W. COPPOCK, OF CLEVELAND, OHIO, ASSIGNOR OF ONE-HALF TO ARTHUR L. KROESEN, OF CLEVELAND, OHIO.

MOTOR VEHICLE.

Application filed February 4, 1925. Serial No. 6,711.

This invention relates to vehicle springs and more particularly to springs that are especially adapted for heavy vehicles, such as busses.

It is one of the objects of the invention to provide an extremely flexible form of spring mounting that will permit the spring to yield in different directions without subjected it or the frame to unusual and destructible stresses.

It is a further object of the invention to provide a spring mounting of a type suitable for transmitting end thrusts between the spring and the frame and at the same time permitting a universal swivelling movement between one end and the frame. It is a further object of this invention to provide a spring mounting that will eliminate the usual shackle connection with the frame, at one end and have in place thereof a form of connection that will accommodate the lengthening and shortening of the spring, due to deflection, and also the rocking movements of the end.

Other objects of the invention and the features of novelty will be apparent from the following description taken in connection with the accompanying drawings, of which:

Figure 1 is a side elevation of a motor vehicle chassis, embodying my invention;

Fig. 2 is an enlarged side elevation of the connection between one end of the spring and the frame, certain parts being shown in section;

Fig. 3 is a transverse section on the line 3—3 of Fig. 2;

Figure 4 is a transverse section on the line 4—4 of Fig. 2;

Fig. 5 is an enlarged elevation of the connection between the other end of the spring and the frame, certain parts being shown in section;

Fig. 6 is a transverse section on the line 6—6 of Fig. 5;

Fig. 7 is a transverse section on the line 7—7 of Fig. 5; and

Fig. 8 is an enlarged fragment of Fig. 1 with a modified form of dust shield.

Referring to the drawings 10 indicates one of the side members of the vehicle frame, 11 the front or steering axle and 12 the rear or driving axle. According to the usual custom each of the axles is connected with the vehicle frame by two multiple leaf springs, one of which is shown at 13 and connects the axle 11 with the side member 10. One of the springs for connecting the axle 12 with the vehicle frame is indicated at 14. While, in Fig. 1, I have shown the springs 13 and 14 as being of novel construction, it will be understood that the invention covered by this application is not limited to this particular type of spring, which I shall describe in detail and claim in another application. The springs 13 and 14 may be of the usual semi-elliptic type except for the novel forms of mounting for the ends which constitutes the present invention.

In Figs. 2 and 3, I illustrate, in detail, my novel form of connection between the forward end of the spring 13 and the side member 10, of the frame. There is secured to the side member 10 a horn or bracket 15 having a cap 16 secured to its lower side by a plurality of bolts 17. The bracket 15 and the cap 16 are formed with a cavity 18 between them and the bracket has a spherical bearing surface 19 which cooperates with a spherical surface 20, on the upper side of the cap 16, to form a seat for a ball on the end of the spring 13. The main leaf 21, of the spring 13, has its end folded upon itself as indicated at 22 and there is an opening 23 through this folded part of the end. Substantially hemi-spherical members 24 and 25 are arranged on the upper and lower sides of the end of the spring and provided with bosses which extend into the opening 23 and thus locate and align these members. The members 24 and 25 are secured together, on the end of the spring, by means of the rivet 26 which also extends through the opening 23. The members 24 and 25 form a spherical ball which fits the bearing surfaces 19 and 20 and thus forms a ball-and-socket joint between the end of the spring and the bracket 15. This ball-and-socket joint permits universal swivelling movements of the end of the spring relative to the frame and thus avoids the destructive tortional stresses to which springs are ordinarily subjected when connected with the frame by the usual knuckle joint.

There is an opening 27 through which the leaf 21 projects into the cavity 18 and it will be noted, from Figs. 2 and 3, that the cavity 18 is made sufficiently large so that the edges of the leaf 17 will not engage with the walls of the cavity. The cavity 18 also provides ample space for lubricant which may be supplied thereto through the connection 28 and thus provide ample lubrication for the bearing surfaces 19 and 20.

In order to exclude dust from the cavity 18 the outer surfaces of the bracket 15 and the cap 16, around the opening 27, are made of spherical form and a dust shield 29 surrounds the end of the spring and is provided with a lining 30 of leather or other suitable material which fits against said spherical surfaces and also closely engages the spring to form a tight joint which will exclude dust. A sleeve 31 is slipped over the end of the spring and abuts the end of the leaf 32. A spring 33 engages the shield 29 and the sleeve 31 and resiliently presses the lining 30 against the bracket 15 and cap 16 so as to provide a tight joint at all times and yet accommodate the relative movements between the spring and the bracket.

In Figs. 5 and 6, I have illustrated, in detail, the connection between the rear end of the spring 14 and the side member 10 and it will be understood that the connection at the rear end of the spring 13 will be, preferably, of the same character. There is a horn or bracket 34 on the rear end of the side member 10 and this bracket has a cap 35 at its lower end which is secured in place by the bolts 36. The bracket 34 and the cap 35 have their adjoining faces so formed as to provide a cavity 37 the walls of which are so shaped as to provide the opposed ridges 38 and 39, the cavity 37 being gradually widened, in the vertical direction, forwardly and rearwardly of the ridges 38 and 39, as will be best seen from Fig. 5. The main leaf 40 of the spring, has its end folded upon itself as indicated at 41 and this end fits between the ridges 38 and 39 so as to be capable of rocking thereon, as the spring deflects, and also to slide back and forth to accommodate the lengthening and shortening of the spring due to its deflection. The side walls of the cavity 37 closely fit the edges of the spring so as to allow only a minimum of lateral play at these points and the enlargement of the cavity 37, as shown in Fig. 5, provides ample space for lubricant which may be supplied through the connection 42.

In order to close the opening into the cavity 37, through which the main leaf 40 projects, a dust shield 43 is provided, this shield being similar to the shield 27 and having a lining 44 of leather or other suitable material. The shield 43 cooperates with cylindrical or spherical surfaces on the bracket 34 and cap 35 so that the shield 43 will be effective in excluding dust notwithstanding the movements of the spring relative to the bracket 34. A clip 45 is secured on the spring and a sleeve 46 similar to the sleeve 31 abuts against this clip and forms a seat for one end of the spring 47 which also engages with the shield 43 and presses the latter toward the bracket 34.

In the construction illustrated in Fig. 8 the bracket 34' and the cap 35' are formed with aligned grooves 48 and 49 and a boot 50, of leather or other suitable material of a flexible nature, is secured over the ends of the bracket 34' and cap 35' and secured in the grooves 48 and 49 by any suitable form of tie 51. The other end of the boot 50 is clamped around the spring by means of the clip 52.

My improved means for mounting the ends of the spring insure, as above stated, a universal swivelling action between the forward end of the spring and the vehicle frame and the ball-and-socket connection therebetween is adapted to transmit end thrusts between the spring and the frame. The mounting at the rear end of the spring, above described, provides a simple form of connection which will compensate for the deflections of the spring and, at the same time, avoid the difficulties which arise with the use of the ordinary shackle construction. The form of mounting at the forward end of the spring 13 will also be used at the forward end of the spring 14 but, while I prefer to use the mountings described above at the forward and rearward ends of each spring, it will be apparent that either mounting may be used independently of the other and with other forms of mounting at the opposite end of the spring.

Having thus described my invention, what I claim is:

1. In vehicle springs, the combination with the vehicle frame including a bracket having a cap secured thereto and forming therewith an enclosed cavity, there being an opening through which a leaf spring is adapted to extend, of a leaf spring having one end arranged in said cavity, the walls of said cavity having opposed fixed ridges engaging the upper and lower surfaces of said spring and on which the spring may rock as it deflects, and said ridges also permitting longitudinal sliding movements of the spring thereon.

2. In vehicle springs, the combination with the vehicle frame including a bracket having a cap secured thereto and forming therewith an enclosed cavity, there being an opening through which a leaf spring is adapted to extend, of a leaf spring having one end arranged in said cavity, the walls of said cavity having opposed fixed ridges engaging the upper and lower surfaces of said spring and on which the spring may rock as it deflects, and said ridges also permitting longitudinal sliding movements of the spring thereon, and means for excluding dust from said cavity.

3. In vehicle springs, the combination with the vehicle frame including a bracket having a cavity therein and an opening through which a leaf spring is adapted to extend, of a leaf spring having one end arranged in said cavity, the walls of said cavity having opposed fixed ridges engaging the upper and lower surfaces of said spring and permitting longitudinal sliding movements of the spring thereon.

In testimony whereof I affix my signature.

LEMBERT W. COPPOCK.